Patented May 5, 1942

2,281,677

UNITED STATES PATENT OFFICE 2,281,677

THIOCYANOMETHYL DERIVATIVES OF PHENYL ETHERS

W E Craig, Philadelphia, and William F. Hester, Drexel Hill, Pa., assignors to Röhm & Haas Company, Philadelphia, Pa.

No Drawing. Application March 26, 1940, Serial No. 326,044

5 Claims. (Cl. 260—454)

This invention concerns thiocyanomethyl derivatives of aromatic ethers. In particular, it deals with thiocyanomethyl derivatives of phenyl ethers and thioethers. These ether derivatives have been found to possess higher insecticidal activity, better solubility in oils used as carriers for insecticides, and to exhibit less odor and irritation than the simple benzyl thiocyanate.

The object of this invention is to provide thiocyanomethyl derivatives of aromatic ethers as new compounds. Another object is to provide an efficient method for preparing these compounds. Yet another object is to provide particularly effective insecticides.

The thiocyanomethyl derivatives of phenyl ethers may be prepared from the analogous halogenomethyl derivatives which may be made from the corresponding phenyl ether by the action of formaldehyde and halogen halide by the method described in German Patent No. 569,570, etc., Chem. Abs. 27, 3723 (1933) and 28, 2687 (1934). Replacement of the halogen is carried out by heating the halide with a metallic thiocyanate (sodium, potassium, lead, calcium, etc.) with or without a solvent in the presence or absence of a catalyst such as copper, sodium iodide, etc. The reaction is conveniently carried out in alcohol by refluxing for several hours. Dilution of the reaction medium with water throws out the product usually as an oil which is separated, washed and dried. It may be purified by dissolving in a suitable solvent and treating with active carbon. The products are oils in most cases.

The following examples are illustrative of this method.

Example 1

Into a stirred mixture of 170 g. (1 mol) of phenyl ether, 243 g. (3 mols) of 37% formaldehyde and 700 g. of hydrochloric acid (sp. gr.=1.18) there was run gaseous hydrogen chloride, which was produced by slowly adding 1250 cc. of concentrated hydrochloric acid to concentrated sulfuric acid. The reaction mixture was maintained at 40-50° C. during this step. An oil resulted which was extracted with petroleum ether, washed three times with water, then with a dilute solution of sodium carbonate, again with water, dried over calcium chloride, and concentrated to give 223 g. of colorless product. The calculated yield was 219 g. The oil contained by analysis 16.59% Cl, which corresponds to a mixture of 96% of the monochloromethyl derivative and 4% of the dichloromethyl derivative.

Two-tenths of a mol (43.7 g.) of the above monochloromethyl phenyl ether in 150 cc. of methyl ethyl ketone was reacted with 33 g. (two equivalents) of 93% sodium thiocyanate at reflux temperature for 1.5 hours. The product, dissolved in benzene, was washed with water until it was free of thiocyanate ions. It was then concentrated to give 47 g. of a light brown oil, which contained by analysis 5.49% of N corresponding to 4-thiocyanomethylphenyl phenyl ether of 95% purity. The product was further purified by extraction with petroleum ether to give an almost white solid melting at 82–87° C.

Example 2

When the general procedure of Example 1 was repeated with the use of 486 g. (6 mols) of formaldehyde and 1 liter of hydrochloric acid in the reaction mixture, the product obtained consisted of 45% of the dichloromethyl derivative and 55% of the monochloromethyl derivative.

This product (54 g.) was readily reacted with 41.0 g. (0.5 mol) of 93% sodium thiocyanate by refluxing for two hours with 200 cc. of copper powder in methyl ethyl ketone. The resulting product was a mixture containing by analysis 6.77% N. This gave a calculated conversion of 88% of the chlorides originally present.

Example 3

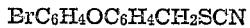

Monochloromethyl phenyl ether, 109.4 g., in an equal weight of ethylene chloride was readily brominated with 82 g. of bromine in the presence of a trace of iodine. From the increase in weight and the quantitative determination of the total silver halide produced from a given weight of sample a quantitative yield of practically 100% BrC6H4OC6H4CH2Cl was obtained.

A sample of 59.5 g. of this product was readily converted to the thiocyanate,

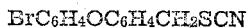

by reaction with 33 g. of 93% sodium thiocyanate in refluxing methyl ethyl ketone (150 cc.) for two hours. The product by nitrogen analysis was 94% pure.

The various thiocyanate ethers were tested for insecticidal activity in emulsifiable preparations in which one part of each product was taken up in one part of oil-soluble sulfonated petroleum oil and two parts of pine oil. Each preparation was emulsified in water to give an effective concentration of one part of the active agent in 1200 parts of water, and applied as a spray to growing plants infested with insects. Counts of insects were made at 48 or 72 hours after the spray had been applied.

The product of Example 1 above killed 52% of large mealy bugs and 99% of small mealy bugs on coleus with no injury to the plants, compared with kills of 35% and 83% respectively in control experiments in which a commercially accepted insecticide was used. There was also obtained a kill of 54% of red spiders on bush beans. The product of Example 2 above killed 40% of large mealy bugs and 91% of small mealy bugs on coleus with practically no injury and 58% of red spiders on bush beans without injury. The product of Example 3 gave a 76% kill of small mealy bugs on coleus with no injury, and a 98% kill of red spiders on bush beans without injury. Tested at a concentration of 1% in a dust as a stomach poison for Mexican bean beetles on bean plants, there was obtained a 99% control (43% incapacitated, 56% killed) with very, very little injury. A comparable experiment with magnesium arsenate gave a 70% control (40% incapacitated, 30% killed).

There may also be prepared, following the procedure shown above, various thioethers and phenyl ethers or phenyl thioethers having nitro, alkyl, aryl, acetamino, benzoyl, etc. groups, including those with several substituents in the molecule. The following are typical ethers:

$C_6H_5SC_6H_4CH_2SCN$—4
4—$NO_2C_6H_4OC_6H_4CH_2SCN$—4
4—$(CH_3)_3CC_6H_4OC_6H_4CH_2SCN$—4
4—$CH_3CONHC_6H_4OC_6H_4CH_2SCN$—4
4—$C_6H_5COC_6H_4OC_6H_4CH_2SCN$
4—$ClC_6H_4OC_6H_4CH_2SCN$—4
2—$C_6H_5C_6H_4OC_6H_4CH_2SCN$—4
2,4—$(NO_2)_2C_6H_3OC_6H_4CH_2SCN$—4
4—$(CH_3)_3CCH_2(CH_3)_2CC_6H_4OC_6H_4CH_2SCN$—4
4—$ClCH_2(CH_3)_2CC_6H_4OC_6H_4CH_2SCN$—4

We claim:

1. Thiocyanomethyl derivatives selected from the group consisting of thiocyanomethyl phenoxybenzenes and thiocyanomethyl phenylthiobenzenes wherein a thiocyanomethyl group is attached directly to an aromatic nucleus.

2. 4-thiocyanomethylphenyl phenyl ether.

3. Bis-4-thiocyanomethylphenyl ether.

4. 4 - thiocyanomethylphenyl - 4 - bromophenyl ether.

5. The process of making thiocyanomethyl derivatives of phenoxybenzenes and phenylthiobenzenes which comprises reacting by heating a member of the group consisting of halogenomethyl phenoxybenzenes and halogenomethylphenyl thiobenzenes with a metallic thiocyanate.

W E CRAIG.
WILLIAM F. HESTER.